Dec. 15, 1970                J. T. GRESHAM                3,547,723
              METHOD OF MAKING PAPER TOWELING MATERIAL
Filed April 19, 1967                              2 Sheets-Sheet 1

Dec. 15, 1970 J. T. GRESHAM 3,547,723

METHOD OF MAKING PAPER TOWELING MATERIAL

Filed April 19, 1967 2 Sheets-Sheet 2

United States Patent Office 3,547,723
Patented Dec. 15, 1970

3,547,723
METHOD OF MAKING PAPER TOWELING MATERIAL
James T. Gresham, Appleton, Wis., assignor to Kimberly-Clark Corporation, Neenah, Wis., a corporation of Delaware
Filed Apr. 19, 1967, Ser. No. 631,962
Int. Cl. B31f 1/00
U.S. Cl. 156—209            6 Claims

ABSTRACT OF THE DISCLOSURE

Two ply paper toweling having a cloth-like feel and texture; creped, embossed sheets constituting the toweling and having opposed surfaces roughened by embossing retained together by a series of longitudinally extending clusters of adhesive dots. A method of forming such paper toweling with webs of limited stretchability at relatively high speed involving the application of adhesive to the rough surface of at least one ply in such manner that the adhesive is disposed randomly and sparsely, the webs being combined under very light pressure in a cushion nip.

BACKGROUND OF THE INVENTION

(1) Field of the invention

This invention relates to paper toweling and also to methods and apparatus for economically obtaining towels which are highly absorbent while exhibiting a cloth-like feel and texture.

(2) The invention with relation to the prior art

Paper towels are manufactured to serve a variety of relatively specific end uses and, accordingly, vary somewhat in their specific structural designs. For example, it is taught by U.S. Pat. 1,964,700 that a two ply paper towel may usefully be constructed to have relatively smooth surfaces of the opposed plies outward in order to provide both a smooth feel and to present a large effective area to the wet skin of a user; the patent also teaches providing relatively rough surfaces of the plies in engagement to occasion voids or air spaces between the plies. The plies so employed are creped webs and may be embossed, the creping and embossing actions taking place successively in towel formation. Embossing and adhesive application may take place as the sheets are plied together as illustrated in U.S. Pats. 2,800,840 or 2,978,006, the action serving to apply the adhesive in spaced dots or the like as is also taught in U.S. Pat. 1,786,781 wherein the adhesive dots are of a water-absorbent nature so that the adhesive contributes to or does not detract from the capability of the towel to serve as a wipe for fluids. This latter patent also notes the desirability of applying the adhesive as a discontinuous film in order that the soft and pliable cloth-like towel product may be achieved. Thus, while the characteristics generally desired in paper toweling have been recognized, the attainment of toweling of the indicated structure is generally somewhat costly, particularly where slow machine speed operations are involved as in the simultaneous peg to peg embossing and adhesive application. It has now been found that limited and random wiping or smearing of adhesive on a relatively rough (embossed) side of a fine creped web follower by bringing the rough surfaces of two such webs into secure engagement without significant pressure application is a practical means of overcoming problems associated with prior art approaches to towel production.

BRIEF DESCRIPTION OF THE DRAWINGS

The invention will be more fully understood by reference to the following detailed description and accompanying drawings wherein.

The operation of towel formation is performed in a rather simple, generally continuous feeding of the creped webs during which the creped, drawn webs are separately embossed, at least one is adhesively treated, the webs are combined into toweling and the toweling is finished as necessary, that is, dried and formed into short rolls or otherwise converted. By the procedure described below, the webs formed into toweling are stabilized to a considerable degree in both the wet and dry condition.

Figure 1:
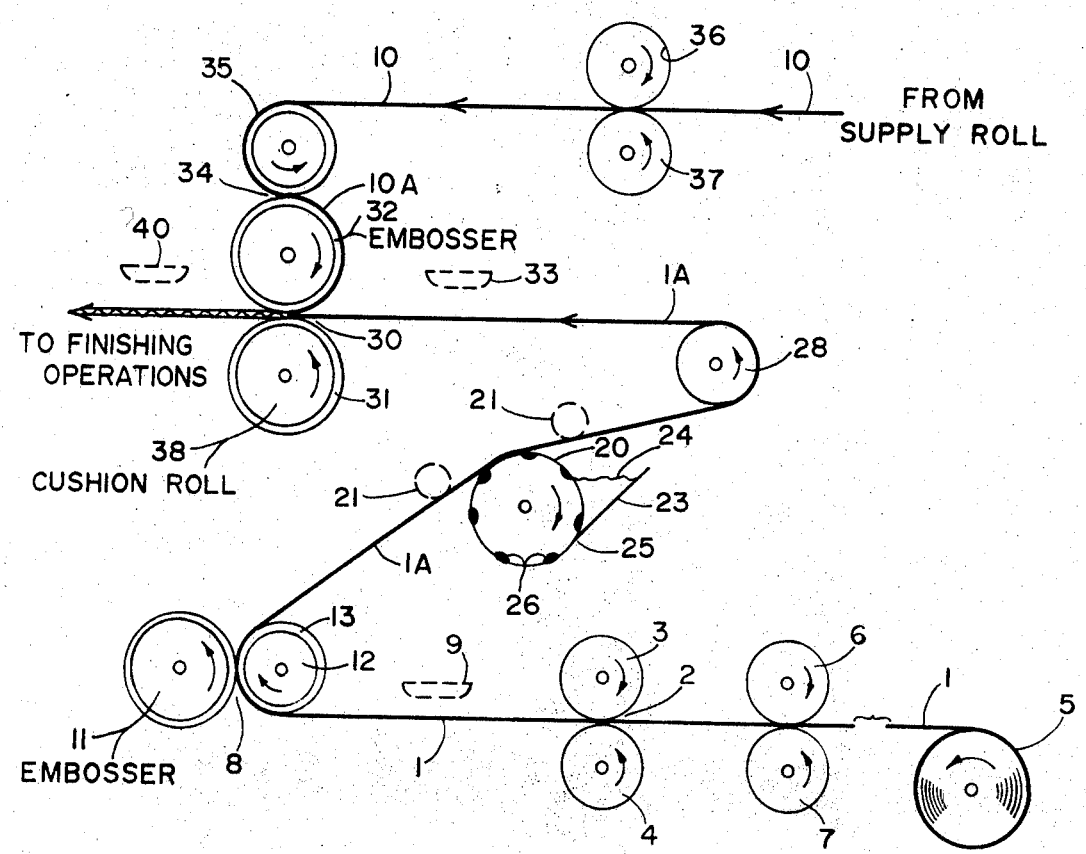
FIG. 1 is a schematic view with web travels shown of an apparatus arrangement for manufacturing a towel in accordance with the invention.

Referring to FIG. 1, a single ply of a fine creped wadding web designated at 1 is fed to the rolling nip 2 formed by steel rolls 3, 4. The web is taken in any suitable manner from rotatably mounted supply roll 5. Suitably driven rolls 6, 7 withdraw the web in known manner.

The wadding sheet, for purposes of this example, is constituted of about 60% softwood bleached sulfite and 40% hardwood bleached kraft pulp; it also may suitably have a finished basis weight of about 14#/2880 sq. ft. ream and a crepe ratio of about 1.5 as the sheet is presented to nip 2. The sheet is also air dry, having a moisture content of about 4–6%. Preferably, the sheet contains a cationic wet strength agent to the extent of about 0.5 to 1% by weight based on dry sheet weight. Various agents for wet strength production in paper are well known and include, for example, those disclosed in U.S. Pats. 2,926,-116 and 2,595,935. Suitably, the web is not sized or calendered as such actions decrease absorbency, bulk and conformability.

Rolls 3, 4 are calender rolls which are driven at a somewhat higher speed than rolls 6, 7 and, accordingly, they serve to effect stretching out and removal of some of the crepe from the web. The stretching suitably reduces the residual stretch in the web (before web rupture or break) to about 25% of the web length.

The web passes from the stretch rolls 3, 4 to a pressure nip 8. If desired, the web may be subjected to heat radiation. This may be from infrared lamp means 9 (indicated in dotted lines) as the web passes to the nip 8 or other suitable means. Heating the web at this zone may serve to eliminate moisture in the web and to further set the bonding between fibers so that it becomes more difficult to eliminate additional residual stretch simply by wetting as in the subsequent adhesive application.

Figure 2:
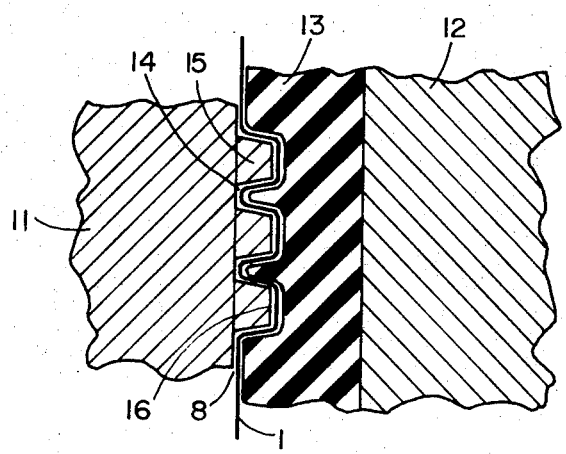
FIG. 2 is a fragmentary and very much enlarged view of the embossing roll arrangement of FIG. 1.

The nip 8 is formed by a driven male embossing roll 11 of steel and a smooth very soft rubber covered roll 12 driven by contact with roll 11. The rubber covered roll 12 is required to have a covering 13 of such softness that it will in large measure fill in the spacings between the protuberances of the male patterned roll. The rubber covered roll for this purpose is of a thickness at least about 8 to 15 times greater than that of the proturberance length and has a Shore durometer A of between about 25 and 40. This insures that the web will have a very soft base presented to it by the rubber covered roll at all times. This corresponds respectively to a P&J plastometer (measured with a ⅛″ ball) of between about 300 and 180. Under such circumstances the web fed to the nip 8 will be further stretched (FIG. 2) in the spacings 14 between (FIG. 2)

the protuberances or pins 15, and such stretching will be practically inelastic.

The steel embossing roll 11 in specific application has a discontinuous pattern which may, for example, be of the type termed a "dull pin" embosser. Suitably, each pin 15 has the shape of a frustum of a cone to provide a relatively wide peak 16. Also, the pins are preferably about 1/8 inch apart on centers and the peaks are suitably of about 1/32 inch to 1/16 inch diameter. The wadding sheet submitted to nip 8 is deformed by stretching to conform to the pin-spacing configuration as the rubber roll yields under the pressure applied by the pins of the embossing roll. The conformity of the web and the rubber covered roll to the exact contour of the spacing between pins probably cannot be achieved completely. However, with the rolls of the degree of softness mentioned, the web between teeth is stretched significantly though not ruptured. The use of rubber covered rolls having a hardness greater than about Shore hardness A of 40 (P&J 180) is not recommended as we have found that such does not permit of adequate retention of the embossments by the paper.

Figure 3:
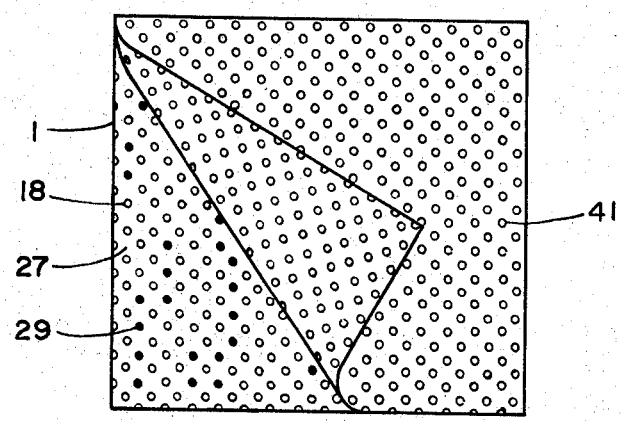
FIG. 3 is a plan view of towel material in accordance with the invention and having one ply partially turned back to illustrate the adhesive configuration.

As the web travel continues from the embosser, the side 1A, which has by virtue of the embossing received the web protuberances, roughly illustrated schematically at 18, (FIG. 4) is directed into contact with the driven steel intaglio applicator roll 20. The intaglio applicator roll 20 is provided with a pattern of small depressions or cells in its periphery. The applicator roll is designed and operated to provide a small but controlled, and adequate for the intended purpose, amount of adhesive on the peaks of the traveling web. Such an applicator is described in the co-pending application Ser. No. 632,283 filed Apr. 20, 1967 of James T. Gresham and Charles A. Henderson and assigned to the same assignee as the present invention. In general, only such an amount of adhesive need be added as to assure that the webs with their confronting rough embossed sides may be handled in manufacture (perforating, breaking, slitting to length, etc.) and use without significant ply separation. The adhesive distribution is quite random (FIG. 3). Strong attachment by application of adhesive to the extent that web flexibility or absorbency is impaired is avoided as unnecessary and as undesirable in toweling. The traveling web wraps the roll only to a very limited extent and the angle of contact may be almost zero, that is, the web may be tangent. In general, the angle of wrap should not be more than about 30°. The roll suitably has a diameter of about 9 inches and the pressure of the web on the roll is very nearly simply that of kiss contact. In some instances where the web to be coated is very light and travels at high speed, a roll or rolls 21 (shown in dotted lines) may be spaced slightly from the applicator roll 20 to maintain the web against windage and flapping movement away from the applicator roll surface. In any event, no significant positive pressure is applied to the web on the applicator roll. It is important in minimizing adhesive application with the specific arrangement described that the web speed over the applicator roll be considerably greater than that of the applicator roll; the speed differential is dependent upon surface roughness to some extent and the differential is less as roughness increases to attain about the same result. Commonly, the web speed is at least about 1½ times and up to about six times or more greater than the surface sped of the applicator roll; such leads to the sequence of adhesive dots forming longitudinally extending clusters separated from other clusters (FIG. 3).

In the specific example under consideration, the web speed was 1000 f.p.m. The surface speed of the intaglio roll was about 250 f.p.m. and in the direction of web travel. This differential speed of 750 f.p.m. causes a metering or wiping of the adhesive onto the web—in distinct contrast to a printing operation, for example. A typical adhesive pattern is that illustrated in FIG. 3. This wiping action and consequent adhesive spreading is an important factor in the procedure as drying of the adhesive in the course of web travel is then more readily accomplished, and at the proper time for attaining optimum adhesion with a minimum of adhesive.

Referring now to the application of the adhesive itself in more detail, it is first to be noted that the adhesive is applied preferably as a relatively dilute aqueous dispersion or solution. For this purpose a trailing doctor blade 23 bears against the roll 20 and retains a pool 24 of the adhesive in contact with the roll. The doctor blade edge 25 functions to exert a hydraulic pressure on the adhesive and to limit the adhesive only to the surface area of the cells illustrated at 26 and to prevent roll surface contamination by excess adhesive. The adhesive preferably is of such a type as to develop a significant inverted (convex to the cell) meniscus. The adhesive itself is suitably an aqueous polyvinyl alcohol solution of about 7% solids concentration by weight and has the appearance of a medium viscosity fluid. In contrast to the usual glues which are of high viscosity, the 7% alcohol solution has a viscosity of between about 500–1000 cps. Brookfield as measured with a No. 2 spindle at 20 r.p.m. Under these conditions about 0.03 pound of adhesive dry basis is added to the web per 2880 sq. ft. ream.

Figure 4:
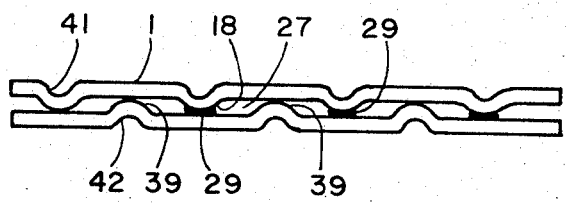
FIG. 4 is a very much enlarged view in transverse section of the sheet of FIG. 3 illustrating the relationship and bonding of the webs.

Substantially none of the adhesive enters the zones 27 between peaks 18 (FIGS. 3 and 4). Certain of the embossment peaks extending over the sheet length may be so positioned relative to the spaced cells of the applicator roll that substantially no adhesive is applied to the peaks so disposed, as may be noted from FIGS. 3 and 4, the adhesive on peaks 18 being indicated at 29. In general, an adhesive dot from an applicator roll cell of about 1/8 inch diameter will be spread on peaks to about 1 inch or more longitudinally on the web, that is, about 8 to 10 times the original meniscus diameter (FIG. 3). In general, a series of five adhesive peaks will have some peaks with very little adhesive. Suitably, between about 10 to 20% of the web area, and not more than 40%, will have adhesive applied. The extent of adhesive application may be readily determined by utilizing a colored adhesive and measuring the extent of application to white toweling.

The traveling web (FIG. 1) leaving the applicator roll 20 is changed in direction by guide roll 28 and directed toward a nip 30 formed between a very soft surface cushion roll 31 and a male patterned embossing roll 32. Roll 31 is driven by contact with roll 32 and the paper webs. Heating means for the purpose of evaporating solvent (usually water) from the adhesive to effect tackiness may be desirable with some materials, and such is suitably effected with infrared heater indicated at 33.

The driven patterned embossing roll 32 (similar to roll 11) forms a pressure nip 34 with a rubber covered roll 35 (similar to roll 12). The crepe wadding web 10, like web 1, is subjected to stretching in any convenient manner as by the rolls 36, 37 functioning like rolls 3, 4. Web 10 is like web 1 and similarly acted upon except that an adhesive application is not necessary. The web 10 is embossed in the nip 34 and is carried on the pin embosser roll to nip 30 with side 10A having the protuberances or embossments 39. In nip 30 the relatively rough (embossed) sides of the two webs are presented in confronting relation. The nip 30 is a well closed nip but very little pressure is exerted because of the nature of cushion roll 31 which spreads readily to provide a wide area of contact with the web.

Cushion roll 31 may be formed of a very soft and thick polyurethane layer mounted on a rigid support 38. In practice, such a cushion which is readily distortable under manual pressure such that the underlying support may be readily sensed by the hand has been found most suitable. This cushion roll is smooth surfaced and slips readily on the traveling web so that no scuffing of the web occurs.

By providing the cushion roll 31 with the substantially rigid embossing roll 32 to form the combining nip 30 space, equipment and some handling of the webs are minimized as well as providing an arrangement in which the soft cushion roll tends, with the web 1, to pick the web 10 from the pins of the patterned roll 32. The softness of the cushion roll and the flattening of the cushion roll, so that pressure is exerted on a wide area contact basis rather than a line contact basis, facilitates this action. For example, the width of contact with a 10-inch diameter cushion roll is suitably 1½ inches. However, it is to be noted that for the purpose of combining the webs at light pressure application, a very soft brush may be employed in place of the polyurethane roll. Or the two embossed webs may be combined in a nip formed by the cushion and another roll independently of roll 32.

The combined web as it passes from the nip 30 (or otherwise depending upon the combining nip location) may be dried at 40. Commonly, the two ply sheet is then subjected to finishing operations which may include, for example, perforating, the formation of small diameter rolls for consumer use and breaking along perforations to attain such rolls, and the forming to rolls of small axial dimension for consumer purposes. Such are indicated by the legend in the drawings.

The product is illustrated in FIGS. 3 and 4. It will be noted that the opposed webs 1, 10 each have the peaks 18, 39 internal of the sheet and that the peaks correspond to depressions 41, 42 in the outside surfaces. These depressions are less noticeable to the touch than the peaks and, accordingly, give the sheet a smooth feel. The rugosity of the opposing surfaces, as in U.S. Pat. 1,964,700, provides for air spaces 27 which are randomly provided. More specifically, the peaks of the two webs may, on occasion, directly abut but, more commonly, the product will be as generally illustrated in FIG. 4. Therein the dry adhesive on the peaks commonly each engage the opposite sheet in the spaces between peaks. Such distribution, it is thought, is suitably described as random orientation. It has been found that any tendency to non-uniform thickness of the two ply toweling so described is not significant either when forming the sheets into rolls or in use. In fact, slight differential pressures in the roll form due to slight differentials in sheet thickness is an aid in preventing "telescoping." Such is a roll defect which may occur when smooth surfaced sheets in roll form slide axially of the roll relatively to each other.

It will be understood that various other modifications are applicable to the procedures outlined above. Specifically, the webs each may have basis weights of between about 10 and 18 pounds per 2880 sq. ft. ream. The webs themselves, as presented to the separate embossers, should have low residual stretch but not such that web tearing occurs. We have found that a residual stretch characteristic of 9% is on the lower side while 15% is quite adequate.

The adhesive weight will be maintained low—preferably between about 0.03 pound and 0.07 pound per ream; the nature of the adhesive is dependent upon the particular results desired but may usually be any conventional adhesive, adequate precautions being taken to insure of tackiness develop to securely retain plies.

Importantly, web speed is high—at least about 900–1000 f.p.m.; preferably the speed is at least 1200–1500 f.p.m. for adequate production rates and the embossing, adhesive and combining treatments described in combination are effective for such purpose.

For the attainment of the relatively limp laminated two ply material having a smooth cloth-like feel and texture and absorbency for use as a towel, I consider it most important that a combination of factors be present. These are that the combining or uniting of the plies be under light pressure, that the adhesive providing for ease of combination be sparsely provided, and that the webs be of relatively low stretch.

As many apparently widely different embodiments of this invention may be made without departing from the spirit and scope thereof, it is to be understood that I do not limit myself to the specific embodiments thereof except as defined in the appended claims.

What is claimed is:

1. In the production of absorbent paper products of wood pulp fibers to provide a relatively limp laminated structure having a cloth-like feel and texture and useful as a toweling material wherein opposed plies of the web material are separately creped to render them soft, drapable and extensible and the crepe is withdrawn from each web individually to provide webs having a limited extensibility in the dry and wet state, the improvement which comprises first withdrawing the crepe from each sheet so that the residual stretch (air dry) is not more than about 25% of the web length but such that some crepe remains in each sheet, embossing the dry webs separately with a pattern which is materially rougher than the creping and with each web in a separate pressure nip formed between a substantially non-resilient male patterned embossing roll and a soft resilient impression roll having a Shore durometer A of between about 25 and 40, the pressure in said nip being sufficient to cause the soft impression roll to fill in between the teeth of the male embossing roll and to urge the web between said teeth by further stretching the web locally, so that the webs are thereby each more stabilized in the wet and dry condition and each has well-spaced peaks on one side and depressions on the other side corresponding to the peaks, randomly distributing a quantity of adhesive on some only of the peaks of at least one of the creped embossed webs, and superposing and combining the webs in a cushion nip with the sides carrying the peaks confronting and the peaks and depressions of one web randomly oriented with respect to the peaks and depressions of the other, said cushion nip having a smooth surfaced distortable cushion roll which flattens in the web combining action to provide a wide area of nip contact in which the web may slip to prevent web scuffing.

2. The process according to claim 1 in which the cushion nip includes a cushion roll which is markedly more soft than the impression roll, said cushion roll in the nip in use providing a large area of contact with the web in contrast to a line contact between web and cushion roll.

3. The process according to claim 2 in which the cushion roll incorporates as cushion material a soft polyurethane material.

4. The process according to claim 1 in which the cushion nip is constituted by a very soft flexible rotatable brush.

5. The process according to claim 1 in which the cushion nip is formed between cushion means for support of at least one of the webs and the male embossing roll of the other of the webs.

6. A process according to claim 1 in which the cushion nip is formed by a cushion roll and the male patterned embossing roll by means of which one of the webs has previously been embossed and the uniting of the webs is effected over an area of contact in the nip so that the latter mentioned of the webs is picked from the male patterned embossing roll by the first web and cushion roll.

References Cited
UNITED STATES PATENTS

| | | | |
|---|---|---|---|
| 2,043,351 | 6/1936 | Fourness et al. | 161—130X |
| 2,179,057 | 11/1939 | Schuetz | 161—127X |
| 2,978,006 | 4/1961 | Clemens | 156—219X |
| 3,414,459 | 12/1968 | Wells | 156—219X |
| 3,424,643 | 1/1969 | Lewis et al. | 161—129X |

SAMUEL W. ENGLE, Primary Examiner

U.S. Cl. X.R.

156—219, 229; 161—127, 130